United States Patent
Fan et al.

(10) Patent No.: US 12,373,394 B1
(45) Date of Patent: Jul. 29, 2025

(54) SCHEDULING AND EXECUTION OF FILE SYSTEM MOUNT OPERATIONS

(71) Applicant: Dell Products L.P., Round Rock, TX (US)

(72) Inventors: Huijuan Fan, Chengdu (CN); Junhua Shao, Chengdu (CN); Nemo Li, Bazhong (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/643,023

(22) Filed: Apr. 23, 2024

(30) Foreign Application Priority Data

Apr. 7, 2024 (CN) .......................... 202410410868.2

(51) Int. Cl.
*G06F 16/00* (2019.01)
*G06F 11/34* (2006.01)
*G06F 16/11* (2019.01)
*G06F 16/182* (2019.01)

(52) U.S. Cl.
CPC ...... *G06F 16/1827* (2019.01); *G06F 11/3409* (2013.01); *G06F 16/119* (2019.01)

(58) Field of Classification Search
None
See application file for complete search history.

(56) References Cited

U.S. PATENT DOCUMENTS

2022/0206903 A1* 6/2022 Mehta ................ G06F 11/1464

OTHER PUBLICATIONS

Shrinbab. Performance Aspects in Virtualized Software Systems. Aug. 2014.*
Dell Technologies, "Dell PowerStore: File Capabilities," White Paper, H18155.5, Jul. 2022, 66 pages.
Dell EMC, "Dell EMC Unity: NAS Capabilities," White Paper, H15572, Jun. 2019, 86 pages.
Dell Technologies, "Dell PowerStore: Introduction to the Platform," White Paper, H18149.9, Oct. 2022, 46 pages.
Dell Technologies, "Dell Unity XT: Introduction to the Platform," White Paper, H17782.5, Oct. 2022, 30 pages.

* cited by examiner

*Primary Examiner* — Tuankhanh D Phan
(74) *Attorney, Agent, or Firm* — Ryan, Mason & Lewis, LLP

(57) ABSTRACT

An apparatus includes a processing device configured to identify and determine prioritizations of file systems to be mounted on a destination storage node, the prioritization for a given file system being based at least in part on a static priority assigned to the given file system, a dynamic priority value calculated for the given file system, and a predicted input-output load for the given file system. The at least one processing device is also configured to determine a system performance of the destination storage node, to generate a schedule for execution of mount operations for the file systems on the destination storage node based at least in part on (i) the determined prioritizations of the file systems and (ii) the determined system performance of the destination storage node, and to execute the mount operations for the file systems on the destination storage node in accordance with the generated schedule.

20 Claims, 10 Drawing Sheets

SCHEDULING AND EXECUTION OF FILE SYSTEM MOUNT OPERATIONS

RELATED APPLICATION

The present application claims priority to Chinese Patent Application No. 202410410868.2, filed on Apr. 7, 2024 and entitled "Scheduling and Execution of File System Mount Operations," which is incorporated by reference herein in its entirety.

BACKGROUND

Storage arrays and other types of storage systems are often shared by multiple host devices over a network. Applications running on the host devices each include one or more processes that perform the application functionality. Such processes issue input/output (IO) operation requests for delivery to the storage systems. Storage controllers of the storage systems service such requests for IO operations. In some information processing systems, multiple storage systems may be used to form a storage cluster.

SUMMARY

Illustrative embodiments of the present disclosure provide techniques for scheduling and execution of file system mount operations.

In one embodiment, an apparatus comprises at least one processing device comprising a processor coupled to a memory. The at least one processing device is configured to identify a plurality of file systems to be mounted on a destination storage node, and to determine prioritizations for respective ones of the plurality of file systems, the prioritization for a given one of the plurality of file systems being based at least in part on a static priority assigned to the given file system, a dynamic priority value calculated for the given file system, and a predicted input-output load for the given file system. The at least one processing device is also configured to determine a system performance of the destination storage node, to generate a schedule for execution of mount operations for the plurality of file systems on the destination storage node based at least in part on (i) the determined prioritizations for respective ones of the plurality of file systems and (ii) the determined system performance of the destination storage node, and to execute the mount operations for the plurality of file systems on the destination storage node in accordance with the generated schedule.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
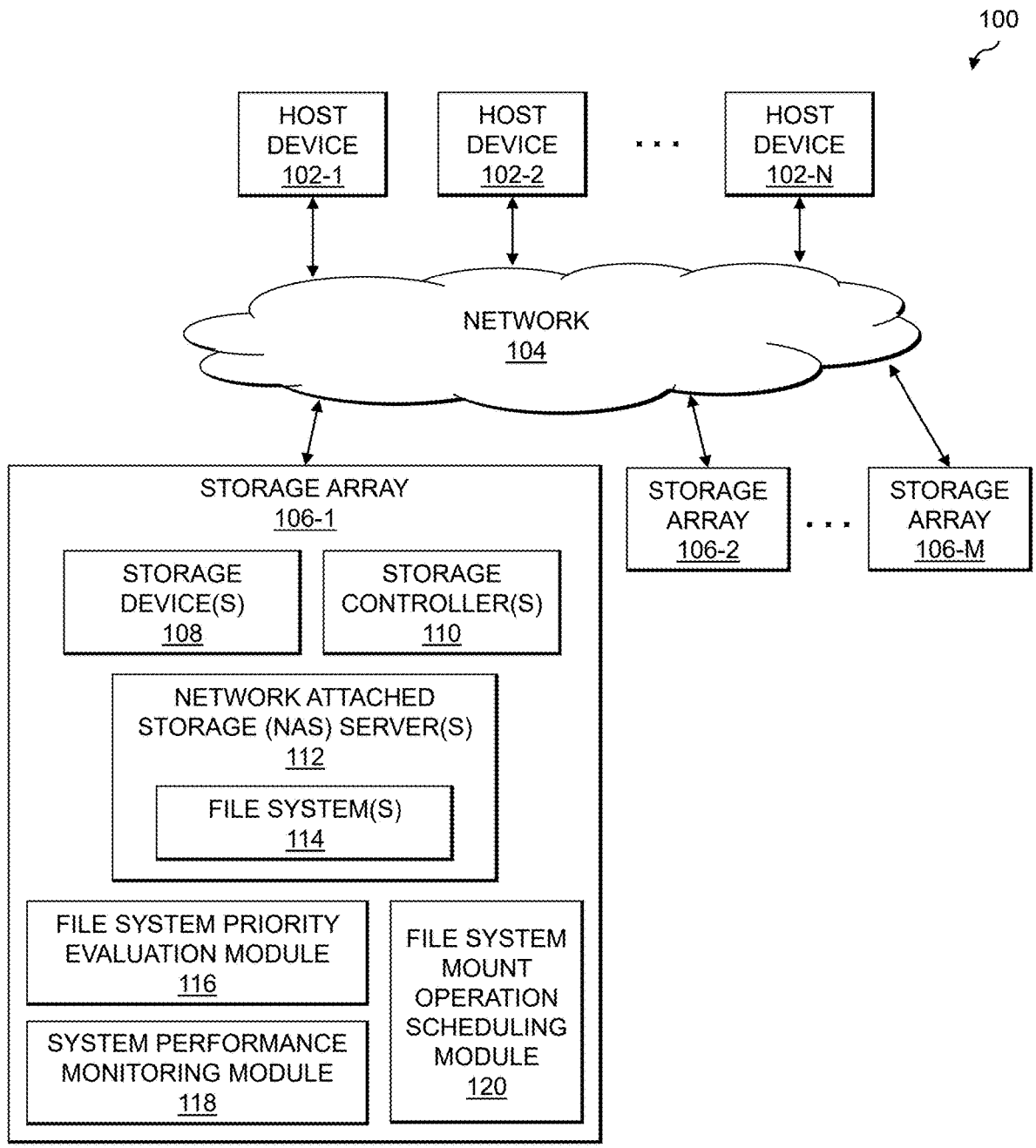
FIG. 1 is a block diagram of an information processing system configured for scheduling and execution of file system mount operations in an illustrative embodiment.

FIG. 1 shows an information processing system 100 configured in accordance with an illustrative embodiment to provide functionality for scheduling and execution of file system mount operations. The information processing system 100 comprises one or more host devices 102-1, 102-2, ... 102-N (collectively, host devices 102) that communicate over a network 104 with one or more storage arrays 106-1, 106-2, ... 106-M (collectively, storage arrays 106). The network 104 may comprise a storage area network (SAN).

The storage array 106-1, as shown in FIG. 1, comprises a plurality of storage devices 108 each storing data utilized by one or more applications running on the host devices 102. The storage devices 108 are illustratively arranged in one or more storage pools. The storage array 106-1 also comprises one or more storage controllers 110 that facilitate input/output (IO) processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input/output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

In the information processing system 100 of FIG. 1, the storage arrays 106 may be part of a storage cluster (e.g., where the storage arrays 106 may be used to implement one or more storage nodes in a cluster storage system comprising a plurality of storage nodes interconnected by one or more networks), and the host devices 102 are assumed to submit IO operations (e.g., as part of storage workloads of one or more applications running on the host devices 102) to be processed by the storage cluster. In some embodiments, each of the storage arrays 106 implements one or more storage nodes of a clustered storage system, where each of the storage nodes runs one or more network-attached storage (NAS) servers having one or more file systems. For example, the storage array 106-1 includes NAS servers 112 running file systems 114.

In some embodiments, the storage cluster or at least one of the storage arrays 106 that are part of the storage cluster are assumed to provide functionality for scheduling execution of file system mount and unmount operations, such as in response to high availability (HA) events affecting storage nodes on which NAS servers run, or in response to other migration of NAS servers among storage nodes or between different ones of the storage arrays 106. For example, the storage array 106-1 may experience an HA event, where the NAS servers 112 and their associated file systems 114 running on the storage array 106-1 (e.g., one or more storage nodes thereof) are failed over to another one of the storage arrays 106-2 through 106-M. The storage array 106-1 may alternatively be a "destination" for failover of an HA event occurring on another one of the storage arrays 106-2 through 106-M. At least one of the storage controllers of the storage arrays 106 (e.g., the storage controller 110 of the storage array 106-1) is assumed to implement functionality for intelligently scheduling and executing file system mount operations. Such functionality is provided by a file system priority evaluation module 116, a system performance monitoring module 118 and a file system mount operation scheduling module 120. The file system priority evaluation module 116 is configured to analyze multiple factors (e.g., a static-defined priority, a dynamically calculated priority, temperature or IO load, etc.) to determine priorities of different ones of the file systems that are to be mounted/unmounted. The system performance monitoring module 118 is configured to monitor resource usage (e.g., central processing unit (CPU) or other processing metrics, memory usage metrics, IO load metrics, etc.) to determine whether the storage array 106-1 (or one or more storage nodes thereof) is able to accommodate file system mount/unmount operations. The file system mount operation scheduling module 120 is configured to schedule file system mount operations based on the file system priorities and the system performance.

Although in the FIG. 1 embodiment the file system priority evaluation module 116, the system performance monitoring module 118 and the file system mount operation scheduling module 120 are shown as being implemented internal to the storage array 106-1 and outside the storage controllers 110, in other embodiments one or more of the file system priority evaluation module 116, the system performance monitoring module 118 and the file system mount operation scheduling module 120 may be implemented at least partially internal to the storage controllers 110 or at least partially outside the storage array 106-1, such as on one of the host devices 102, one or more other ones of the storage arrays 106-2 through 106-M, on one or more servers external to the host devices 102 and the storage arrays 106 (e.g., including on a cloud computing platform or other type of information technology (IT) infrastructure), etc. Further, although not shown in FIG. 1, other ones of the storage arrays 106-2 through 106-M may implement respective instances of one or more of the file system priority evaluation module 116, the system performance monitoring module 118 and the file system mount operation scheduling module 120.

At least portions of the functionality of the file system priority evaluation module 116, the system performance monitoring module 118 and the file system mount operation scheduling module 120 may be implemented at least in part in the form of software that is stored in memory and executed by a processor.

As noted above, the storage arrays 106 in some embodiments are assumed to be part of a storage cluster. The storage cluster is assumed to provide or implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

It should be appreciated that a multi-tier storage system may include more than two storage tiers, such as one or more "performance" tiers and one or more "capacity" tiers, where the performance tiers illustratively provide increased IO performance characteristics relative to the capacity tiers and the capacity tiers are illustratively implemented using relatively lower cost storage than the performance tiers. There may also be multiple performance tiers, each providing a different level of service or performance as desired, or multiple capacity tiers.

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of one or more of the host devices 102 and one or more of the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 may be implemented at least in part in the first geographic location, the second geographic location, and one or more other geographic locations. Thus, it is possible in some implementations of the system 100 for different ones of the host devices 102 and the storage arrays 106 to reside in different data centers.

Numerous other distributed implementations of the host devices 102 and the storage arrays 106 are possible. Accordingly, the host devices 102 and the storage arrays 106 can also be implemented in a distributed manner across multiple data centers.

Additional examples of processing platforms utilized to implement portions of the system 100 in illustrative embodiments will be described in more detail below in conjunction with FIGS. 9 and 10.

It is to be understood that the particular set of elements shown in FIG. 1 for implementing functionality for scheduling and execution of file system mount operations is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for scheduling and execution of file system mount operations will now be described in more detail with reference to the flow diagram of FIG. 2. It is to be understood that this particular process is only an example, and that additional or alternative processes for scheduling and execution of file system mount operations may be used in other embodiments.

In this embodiment, the process includes steps 200 through 208. These steps are assumed) to be performed by the file system priority evaluation module 116, the system performance monitoring module 118 and the file system mount operation scheduling module 120. The process begins with step 200, identifying a plurality of file systems to be mounted on a destination storage node. Identifying the plurality of file systems to be mounted on the destination storage node may comprise identifying a high availability (HA) event affecting a source storage node on which the plurality of file systems were previously mounted. The plurality of file systems may run on one or more NAS servers, and identifying the plurality of file systems to be mounted on the destination storage node may be responsive to migration of the one or more NAS servers from a source storage node to the destination storage node.

In step 202, prioritizations for respective ones of the plurality of file systems are determined. The prioritization for a given one of the plurality of file systems is based at least in part on a static priority assigned to the given file system, a dynamic priority value calculated for the given file system, and a predicted input-output load for the given file system. The static priority assigned to the given file system may comprise a user-defined priority. The dynamic priority value for the given file system may be calculated based at least in part on one or more characteristics of the given file system. The one or more characteristics of the given file system may comprise a number of snapshots of the given file system. The predicted IO load for the given file system may be determined utilizing an exponential moving average of historical IO operations per second (IOPS) directed to the given file system.

In step 204, a system performance of the destination storage node is determined. The system performance of the destination storage node may be based at least in part on one or more processing resource usage metrics, one or more memory usage metrics, and one or more IO load metrics.

In step 206, a schedule for execution of mount operations for the plurality of file systems on the destination storage node is generated, based at least in part on (i) the determined prioritizations for respective ones of the plurality of file systems and (ii) the determined system performance of the destination storage node. Generating the schedule for execution of the mount operations for the plurality of file systems on the destination storage node may comprise generating two or more execution queues, each of the two or more execution queues being associated with a different static priority value, adding a first subset of the plurality of file systems assigned a first static priority value to a first one of the two or more execution queues, and adding a second subset of the plurality of file systems assigned a second static priority value to a second one of the two or more execution queues. Generating the schedule for execution of the mount operations for the plurality of file systems on the destination storage node may further comprise ordering the first subset of the plurality of file systems within the first execution queue based at least in part on dynamic priority values and predicted IO loads for the first subset of the plurality of file systems, and ordering the second subset of the plurality of file systems within the second execution queue based at least in part on dynamic priority values and predicted IO loads for the second subset of the plurality of file systems.

In step 208, the mount operations for the plurality of file systems are executed on the destination storage node in accordance with the generated schedule. In some embodiments, the determined system performance is dynamically updated during execution of the mount operations for the plurality of file systems, and the generated schedule is adjusted based at least in part on the dynamically updated system performance. Adjusting the generated schedule may comprise pausing scheduling of mount operations for one or more of the plurality of file systems responsive to the dynamically updated system performance being less than a designated performance threshold. Adjusting the generated schedule may also or alternatively comprise adjusting a number of mount operations for the plurality of file systems which are permitted to be executed concurrently (e.g., in response to the system performance being less than the designated performance threshold).

Figure 2:
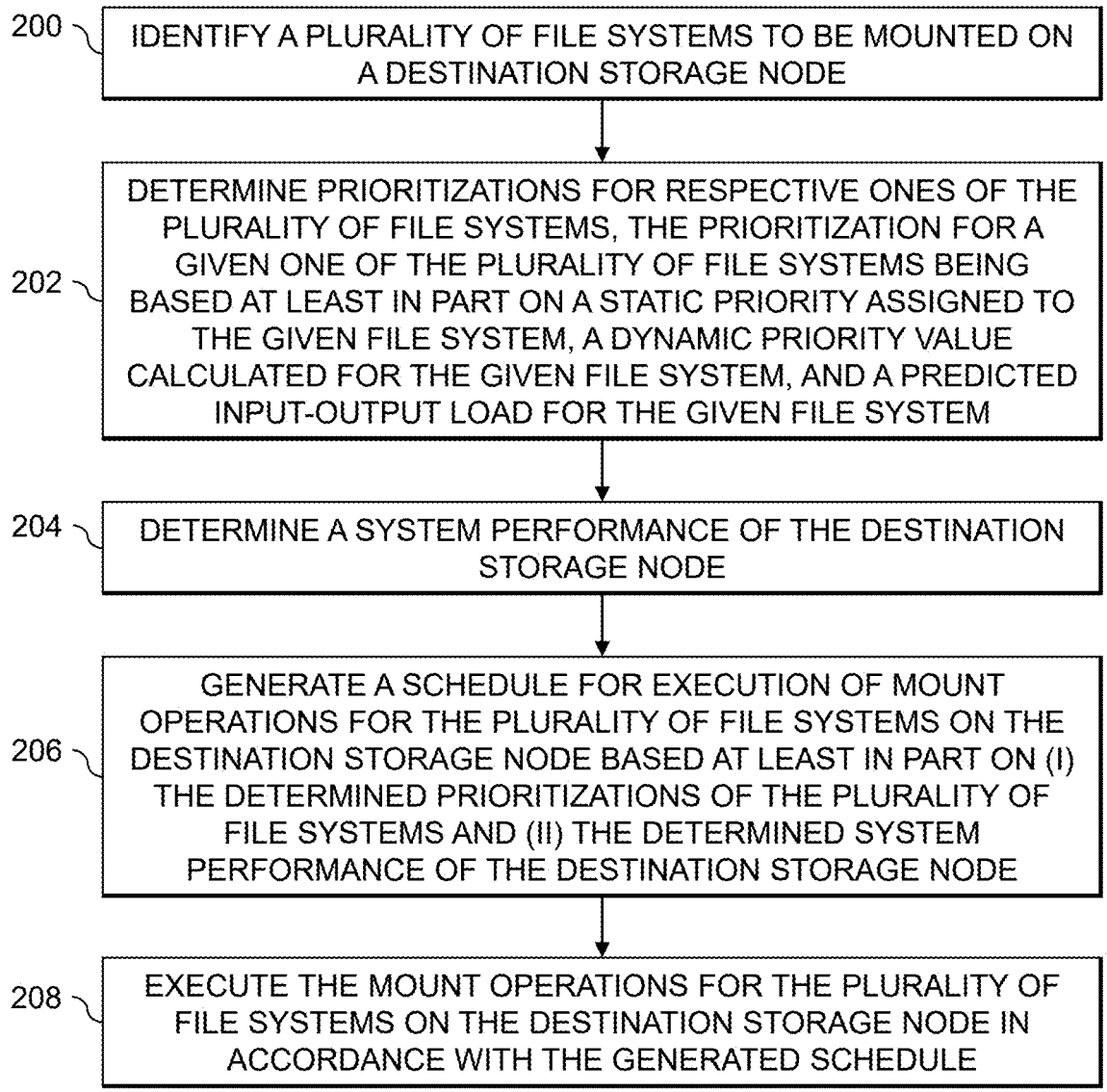
FIG. 2 is a flow diagram of an exemplary process for scheduling and execution of file system mount operations in an illustrative embodiment.

The particular processing operations and other system functionality described in conjunction with the flow diagram of FIG. 2 are presented by way of illustrative example only, and should not be construed as limiting the scope of the disclosure in any way. Alternative embodiments can use other types of processing operations. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Storage systems, such as enterprise NAS systems, may utilize two or more storage nodes for enabling high availability (HA) functionality. In the event of a disaster or other event affecting a given failed storage node, the software architecture supports failing over NAS resources (e.g., NAS servers, file systems, snapshots, etc.) to another living storage node to avoid a single point of failure. During failover, the maximum outage of a data object is bounded by the protocol IO timeout. When the protocol IO timeout is exceeded, NAS users perceive real data unavailability (DU) (e.g., IO errors). The DU time is influenced by various factors, such as file access protocol type, number of NAS objects, system load, etc. As such, DU is more likely to occur in worst case scenarios on busy storage systems with large numbers of NAS objects.

Illustrative embodiments provide technical solutions for avoiding or minimizing DU concerns in storage systems, including NAS systems, through optimizing or improving failover and failback processes for storage resources (e.g., NAS resources) to minimize or reduce potential user-perceivable outage.

Figure 3:
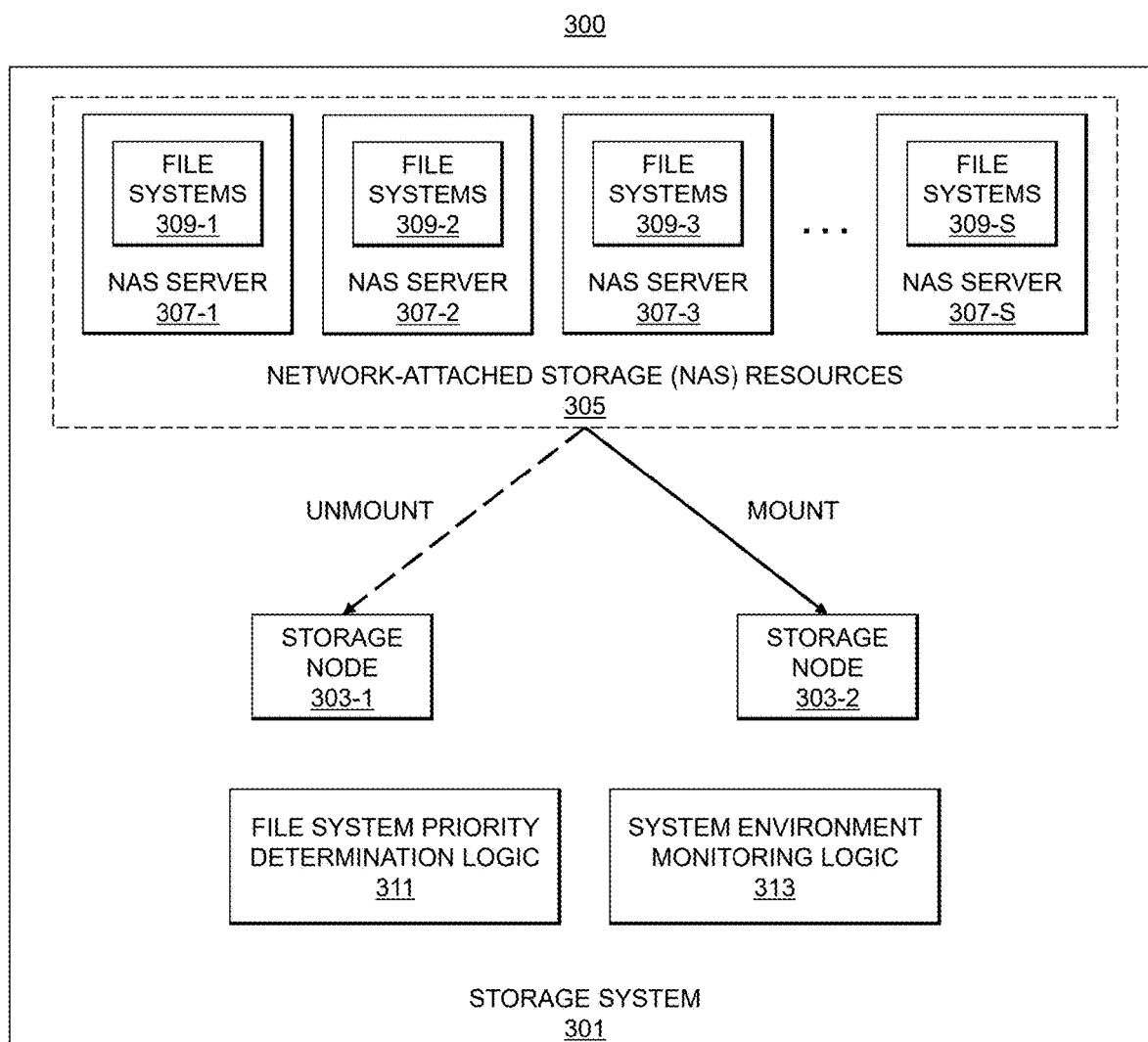
FIG. 3 shows a storage system experiencing a high availability event where network attached storage resources are unmounted from a first storage node and mounted to a second storage node in an illustrative embodiment.

FIG. 3 shows a system 300 including a storage system 301, which may be a clustered storage system, including storage nodes 303-1 and 303-2 (collectively, storage nodes 303). It should be noted that the storage system 301 may include more than two storage nodes 303, although only two are shown in FIG. 3 for clarity of illustration. The storage system 301 includes a set of NAS resources 305, including a set of NAS servers 307-1, 307-2, 307-3, . . . 307-S (collectively, NAS servers 307) each running one or more file systems 309-1, 309-2, 309-3, . . . 309-S (collectively, file systems 309).

Figure 4:
FIG. 4 shows a table illustrating details of a high availability event affecting a storage system in an illustrative embodiment.

Whenever a HA event is triggered, such as a NAS server reboot or panic on a given storage node, NAS resources will failover to another storage node and NAS server initialization and file system mount operations will be performed. In the context of the system 300, for example, it is assumed that the NAS resources 305 are running on storage node 303-1, and that a HA event is triggered causing the NAS resources 305 to be unmounted from the storage node 303-1 and mounted on the storage node 303-2. FIG. 4 shows a table 400 showing an entry for a HA event, including an identifier, priority, a summary of the error causing the HA event, and a root cause analysis of the HA event. In cases where the NAS resources 305 are large (e.g., a large number of NAS servers 307, a high count of the file systems 309, etc.), users may experience or perceive DU (e.g., IO requests exceeding a protocol timeout) during the HA event. This is because file system mount operations are costly, especially the rationalization of storage volumes. For example, a storage node may utilize storage volumes which are divided into 256 megabyte (MB) slices, which are handed out and used by file systems mounted on that storage node. The file system, however, may always think that it has a very large address space (e.g., many petabytes (PB)), though the file system may actually sit on top of or run on a real storage volume that can vary in size, such as from 3 gigabytes (GB) to 256 terabytes (TB). The first phase of a file system mount operation involves rationalizing or checking the storage volume to make sure that everything is the same with the volume layout of the slices. To rationalize or check the volume, memory is needed to process the storage volume data. The amount of memory needed is a function of the real size of the storage volume. The larger the storage volume, the more memory is needed.

Memory resources are limited, and when mounting a large number of file systems at the same time there may be situations in which file system mount operations must wait for memory resources to become free. When there are many very large file systems (e.g., which require or utilize large storage volumes), such issues are exacerbated. Because of the large number of file systems and a tendency for over-provisioning, there may be significant contention for memory resources which are dedicated or allocated to this portion of the file system mount process, resulting in serialization of file system mounts and extended file system mount times.

Conventional approaches for failover or failback of NAS resources in storage systems suffer from various technical problems, including that priority is not considered during HA processing (e.g., mission critical and low priority file systems are treated equally). Another technical problem is that the "temperature" (e.g., IO load) of file systems are not taken into account during HA processing. For example, a "cold" file system may be insensitive to DU because there are no or relatively few IO operations directed to that file system. A "hot" file system, on the other hand, has a higher probability to perceive DU during an HA event.

The technical solutions described herein provide approaches for optimizing or improving the mount process for file systems, such as during HA events in a storage system. The technical solutions are able to optimize or improve the file system mount sequence through taking into account a variety of factors, including priority (e.g., both a user-defined or static file system priority and a dynamic file system priority based on characteristics of file systems) and file system temperature. In some embodiments, an exponential moving average (EMA) is used to more accurately analyze and calculate IOPS or other IO activity metrics (e.g., which are used to characterize file system temperature) during HA events. The technical solutions are also advantageously able to improve the health of storage environments, including NAS system environments, through functionality for evaluating comprehensive system environment performance. To do so, some embodiments monitor various characteristics of the storage system, such as system resource usage metrics, and make sure that such metrics are within defined safety threshold ranges. This allows for higher priority file systems to be mounted on time to avoid DU (e.g., servicing client IO requests) and guaranteeing system health during HA events, including health of resources such as CPU or other processing resources, memory, IO load (e.g., IOPS, etc.), etc.

As shown in FIG. 3, the storage system 301 implements various logic for optimizing or improving the mount process for file systems during a HA event (e.g., mounting the NAS resources 305 to the storage node 303-2 during a HA event affecting storage node 303-1). Such logic includes file system priority determination logic 311 and system environment monitoring logic 313. The file system priority determination logic 311 is configured to determine priorities of the various file systems 309 running on the NAS servers 307, while the system environment monitoring logic 313 is configured to monitor various metrics (e.g., CPU, memory, IO load, etc.) associated with the storage nodes 303. Such information will be used in selecting an order in which to perform mount operations for different ones of the file systems 309 on the storage node 303-2, and for determining when the storage node 303-2 has available resources for performing such mount operations.

Figure 5:
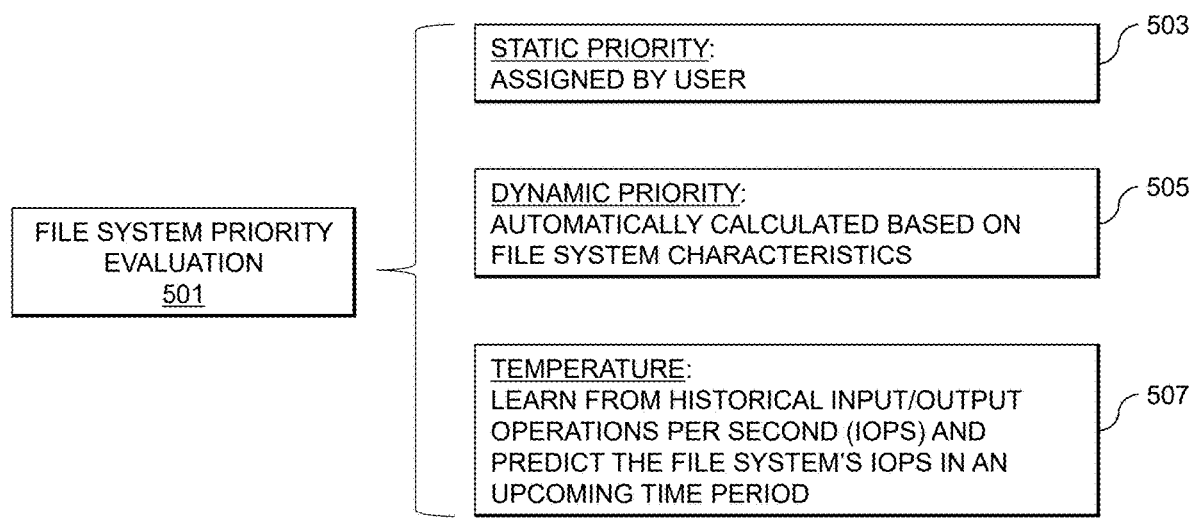
FIG. 5 shows a file system priority evaluation methodology in an illustrative embodiment.

FIG. 5 illustrates a file system priority evaluation 501, which may be implemented as part of the file system priority determination logic 311. During HA events, the file system priority is used to select an order for mounting file systems to minimize potential perceivable DU. In FIG. 5, the file system priority evaluation 501 is based on a static priority 503 that is assigned by a user, a dynamic priority 505 that is automatically calculated based on file system characteristics, and a temperature 507 that predicts the file system's IOPS in an upcoming time period based on learning from historical IOPS for that file system.

The static priority 503, denoted S, is a value which is manually assigned to a file system by a user. Users can explicitly assign higher priority to a file system when it is important, or assign a lower priority to a file system when it is not important. In some embodiments, the static priority S is set as one of high, medium, and low. For prioritization, file systems with S=High are prioritized over file systems with S=Medium, and file systems with S=Medium are prioritized over file systems with S=Low. In other embodiments, various other values may be used for the static priority S (e.g., 1 to 10 or some other numeric scale, critical or non-critical, etc.). Various factors may be taken into account when no static priority value is specified for a particular file system, or when multiple file systems have the same static priority value.

The dynamic priority 505, denoted D, is a value which is automatically calculated based on characteristics of a file system. For example, the dynamic priority D may be based on the number of snapshots of a file system. A snapshot is a point-in-time copy of the file system state (e.g., for data protection purposes). A file system may be more important (and thus have a higher dynamic priority value D) when it has more snapshots, because a storage administrator will usually either manually take or assign more intensive snapshot rules to critical file systems for more data protection. Further, mounted snapshots have significant impact on the memory consumption by file system mount operations during HA events.

The temperature 507, denoted T, characterizes predicted IOPS during an upcoming time period, and may be calculated by learning from historical IOPS. File systems with higher temperature values may have a higher probability of perceiving DU given that such file systems have more ongoing IO operations.

Equations which may be used in some embodiments for calculating the static priority 503, dynamic priority 505 and temperature 507 will now be described.

The static priority 503 of a file system, which is explicitly assigned by the user, is represented as $S \in$ (High, Medium, Low). By default (e.g., if no user-assigned priority is specified, S may be set to Medium.

The dynamic priority 505 of a file system is represented as $D \in (0, 1)$, and may be calculated based on various characteristics such as the number of snapshots of the file system, denoted $N_s$, and the maximum number of snapshots that the file system supports, denoted $Max_s$ (e.g., which may be defined in a scalability product requirement document), where:

$$D = \frac{N_s}{Max_s}$$

The temperature 507 of a file system is represented as $T \in (0, 100)$, and may be calculated by analyzing recent historical IOPS during a selected time period. In some embodiments, an exponential moving average (EMA) is used to project the possible or predicted IOPS in an upcoming time period (e.g., during an HA event). EMA weights samples in geometrically decreasing order, so that the most recent samples are weighted most highly while the most distance samples contribute very little, and may be calculated according to:

$$T_t = \alpha \times I_t + (1-\alpha) \times T_{t-1}$$

where t denotes time and where t>0, $\alpha$ is the smoothing factor, $I_t$ is the actual IOPS at time t, and $T_t$ is the output of the EMA (e.g., representing the estimate of what the next value of IOPS will be at time t. $\alpha \in (0,1]$, and N is the number of t. In real-world environments, applications running on top of NAS may generate IOPS periodically (e.g., hourly, daily, weekly, etc.). In that case, a proper N value that matches its frequency should be chosen to get better forecasting:

$$\alpha = \frac{2}{1+N}$$

Figure 6:
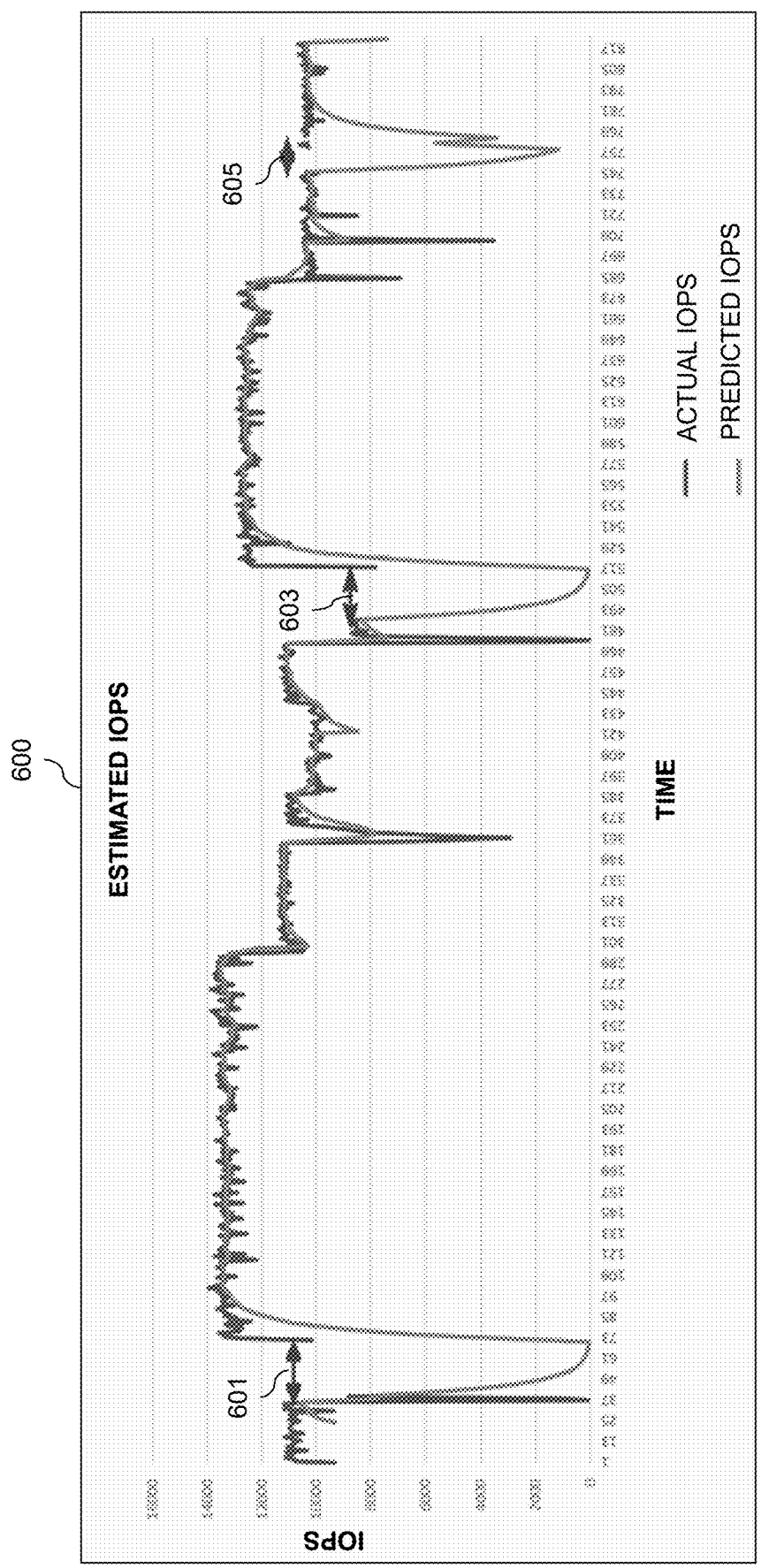
FIG. 6 shows a plot of actual and predictor input-output operations per second for a storage system which undergoes multiple high availability events in an illustrative embodiment.

Consider, for example, that average IOPS is captured every 5 seconds. To get the IOPS in the last one minute, N=12 and then $\alpha$=0.153846154. By analyzing historical IOPS statistics, projected or predicted IOPS can be analyzed by calculating the EMA. FIG. 6, for example, shows a chart 600 of the estimated IOPS, where the chart 600 shows IOPS as a function of time, and both the actual IOPS and estimated IOPS (e.g., temperature) are plotted. The chart 600 also labels HA events 601, 603 and 605.

$W_d$ and $W_t$ denote weights assigned to the dynamic priority and temperature, respectively, where $W_d \in (0,1)$, $W_t \in (0,1)$ and $W_d + W_t = 1$. $N_d$ and $N_t$ represent the dynamic priority and temperature values after normalization, respectively, where $N_d \in (0,1)$ and $N_t \in (0,1)$. $N_d$ is calculated according to:

$$N_d = \frac{D - \min(D)}{\max(D) - \min(D)}$$

$N_t$ is calculated according to:

$$N_t = \frac{T - \min(T)}{\max(T) - \min(T)}$$

Using the above equations, each file system's priority P for HA is determined according to:

$$P = N_d \times W_d + N_t \times W_t$$

Then, the file system priority is ranked according to the following rules:
1. Based on the static priority, all file systems are prioritized and lined up in different queues (e.g., High, Medium, Low);
2. In each queue, file systems are prioritized based on the calculated priority values P; and
3. The queues are lined up and processed one after another sequentially (e.g., from High to Medium to Low).

Figure 7:
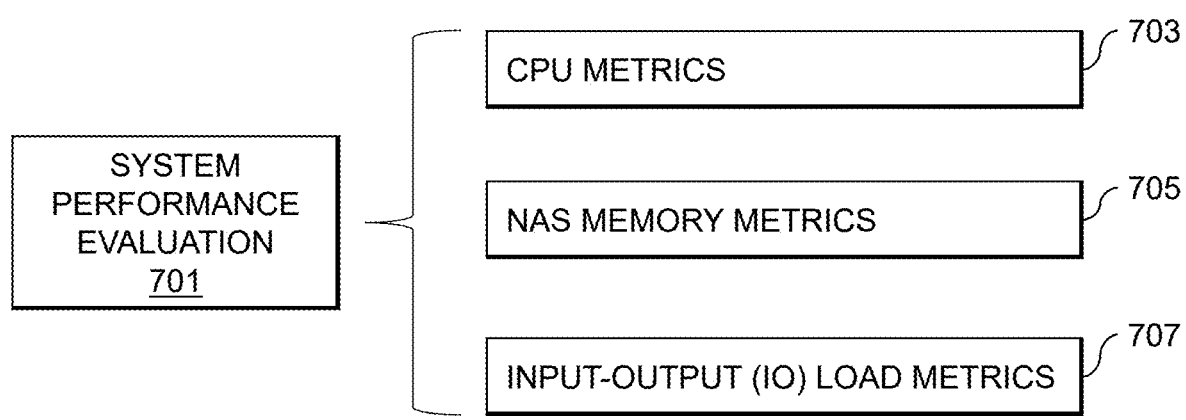
FIG. 7 shows a storage system performance evaluation methodology in an illustrative embodiment.

FIG. 7 illustrates system performance evaluation 701, which may be implemented as part of the system environment monitoring logic 313. The system performance evaluation 701 is based on CPU or other processing resource metrics 703, memory metrics 705, and IO load metrics 707. During mounting of a file system, memory is allocated in the core file system structure and a temporary IO cache. After memory is allocated, IO requests are sent to block devices to read super blocks and other information. When a read IO request is complete, the CPU will calculate the core file system structure from the temporary IO and then complete the mount job. When mounting a lot of file systems at the same time, parallel mounting will be faster than sequential so several file systems may be mounted at the same time. As noted in the table 400 of FIG. 4, however, during a HA event where too many file systems are mounted at the same time, too much resources may be consumed. Thus, in order to make sure that high priority file systems are mounted first and on time, physical resource usage should be monitored for better service of user IO on time.

When a HA event occurs, file systems will be mounted on a new storage node (e.g., in the FIG. 3 example, the NAS resources 305 including the file systems 309 running on NAS servers 307 previously mounted to the storage node 303-1 are mounted on the storage node 303-2). The current CPU or other processing resource metrics 703, memory metrics 705 and IO load metrics 707 for the new storage node (e.g., storage node 303-2 in the FIG. 3 example) are monitored while the file system mount operations are in progress.

If current CPU usage is high, fewer file system mount operations or jobs may be run on the storage node. If too many file system mount operations or jobs are run at the same time, then high priority file systems may not be mounted on time. If current memory usage is high, the storage node will also need to wait for memory resources or swap memory resources to make some space for new file system mount operation requests. As for IO, if beyond the available IO bandwidth, IO requests for lower priority file systems may return earlier than IO requests for higher priority file systems, which will cause higher IO latency for the higher priority file systems. As such, the technical solutions enhance file system mounting processes by monitoring current system load using the system performance evaluation 701. System load may be evaluated according to the following equation:

$$\text{Sys\_load}(C_i, M_i, IO_i) = \omega_c C_i^x + \omega_m M_i^y + \omega_{io} IO_i^z$$

where $C_i$, $M_i$, $IO_i$ are current time CPU, memory, and IO usage, where $C_i \in (0,1)$, $M_i \in (0,1)$, $IO_i \in (0,1)$, where 0 means no resource usage and 1 means full resource usage. $\omega_c$ is a user-defined weight for CPU usage metrics, $\omega_m$ is a user-defined weight for memory usage metrics, and $\omega_{io}$ is a user-defined weight for IO load metrics, and x,y,z are user-defined for more weight on resource usage. If the current system is reaching limits, Sys_load will grow faster. If the current system is at low level, Sys_load will grow slower. A user will define a limit of threshold=Sys_load $(C_{max}, M_{max}, IO_{max})$. When one or more file systems need to be add to a mounting list, the current system load will be evaluated as Sys_load $(C_i, M_i, IO_i)$, and if Sys_load $(C_i, M_i, IO_i)$<threshold, new file systems could be added to the mounting list for mounting. Otherwise, the current Sys_load will be evaluated until it is less than user-defined threshold, at which point new file systems may be added to the mounting list.

Figure 8:
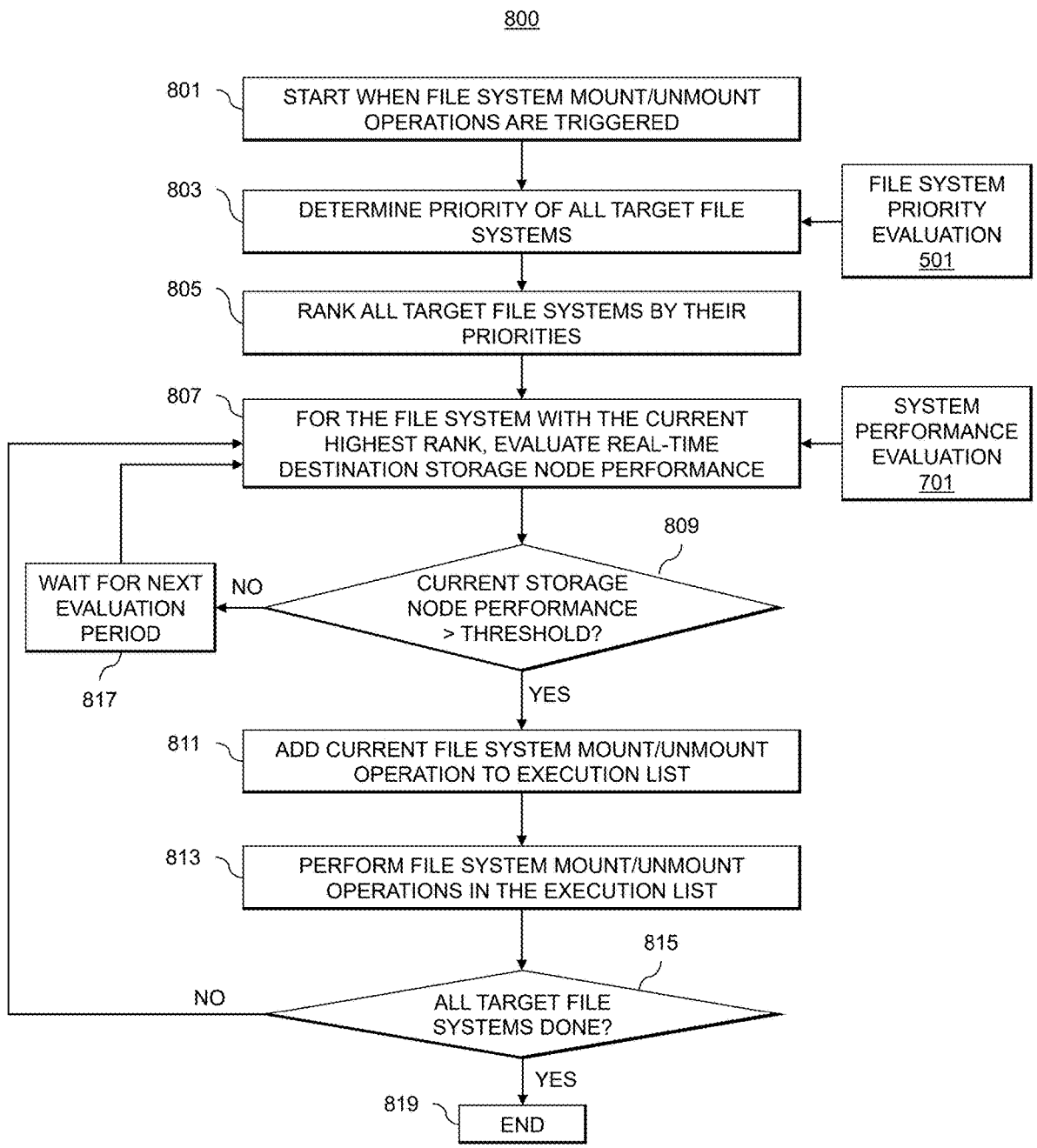
FIG. 8 shows a process flow for scheduling and executing file system mount operations on a storage system in an illustrative embodiment.

FIG. 8 shows a process flow 800 for optimizing the scheduling and execution of file system mount and unmount operations (e.g., which may be triggered during HA events) on a storage system (e.g., the storage system 301 of FIG. 3). The process flow 800 starts in step 801, where file system mount/unmount operations are triggered. In step 803, the priority of all target file systems is determined. Step 803 may utilize the file system priority evaluation 501 described above with respect to FIG. 5. In step 805, all target file systems are ranked by their priorities (P). In step 807, for the file system with the current highest rank, the real-time performance of its destination storage node (e.g., the storage node to which that file system is to be mounted) is evaluated. Step 807 may utilize the system performance evaluation 701 described above with respect to FIG. 7. In step 809, a determination is made as to whether the current performance of the destination storage node is greater than a threshold. If the result of the step 809 determination is yes, the process flow 800 proceeds to step 811 where the mount/unmount operation for the current file system (e.g., the file system with the highest rank) is added to an execution list. In step 813, the file system mount/unmount operations in the execution list are performed. In step 815, a determination is made as to whether all target file systems are done (e.g., have been mounted/unmounted). If the result of the step 815 determination is no, the process flow 800 returns to step 807. If the result of the step 809 determination is no, the process flow 800 proceeds to step 817 where the process flow 800 waits for a next system evaluation period and then returns to step 807. If the result of the step 815 determination is yes, the process flow 800 ends in step 819.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for scheduling and execution of file system mount operations will now be described in greater detail with reference to FIGS. 9 and 10. Although described in the context of system 100, these platforms may also be used to implement at least portions of other information processing systems in other embodiments.

Figure 9:
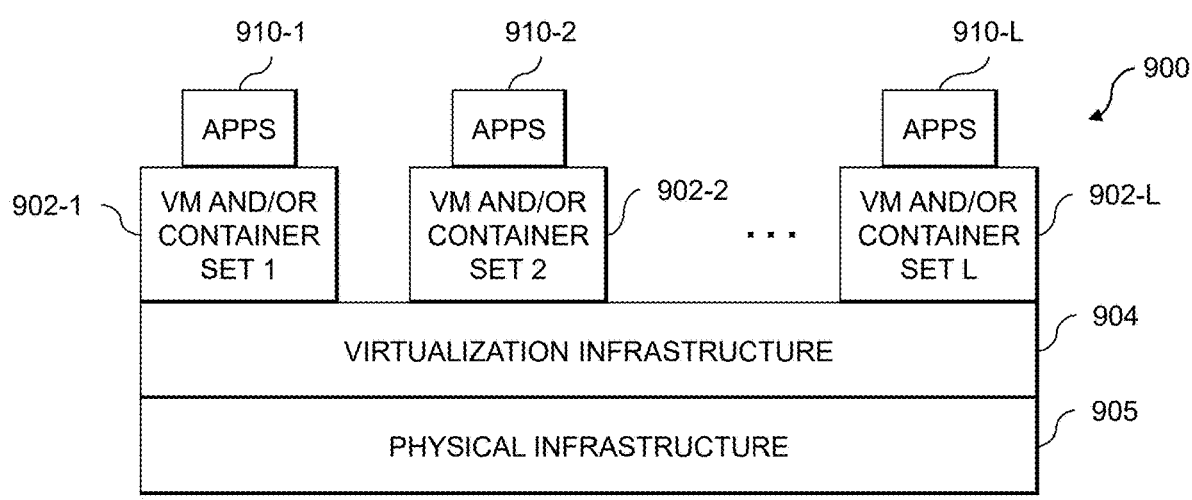
FIGS. 9 and 10 show examples of processing platforms that may be utilized to implement at least a portion of an information processing system in illustrative embodiments.
Figure 10:
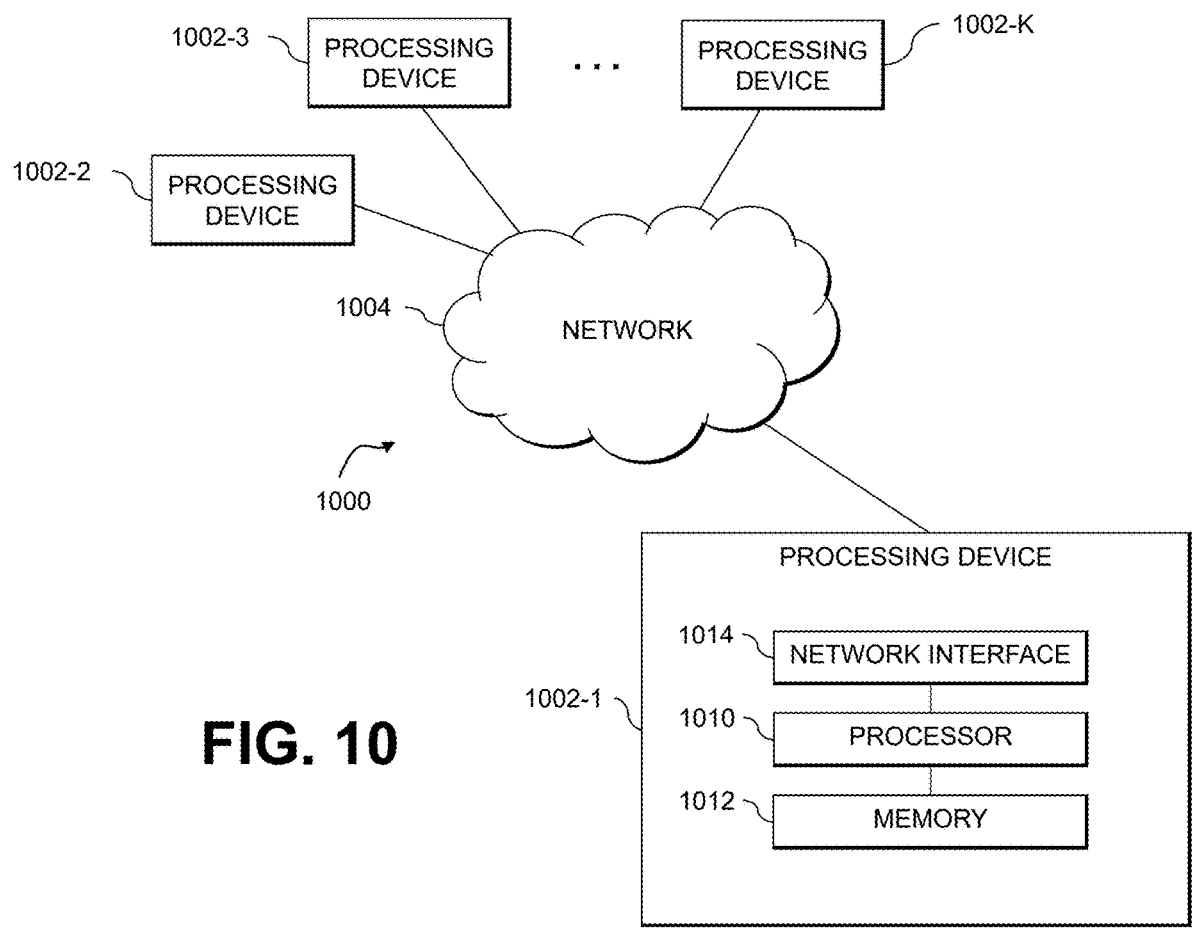

FIG. 9 shows an example processing platform comprising cloud infrastructure 900. The cloud infrastructure 900 comprises a combination of physical and virtual processing resources that may be utilized to implement at least a portion of the information processing system 100 in FIG. 1. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for scheduling and execution of file system mount operations as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured:
   to identify a plurality of file systems to be mounted on a destination storage node;
   to determine prioritizations for respective ones of the plurality of file systems, the prioritization for a given one of the plurality of file systems being based at least in part on a static priority value assigned to the given file system, a dynamic priority value calculated for the given file system, and a predicted input-output load for the given file system;
   to determine a system performance of the destination storage node;
   to generate a schedule for execution of mount operations for the plurality of file systems on the destination storage node based at least in part on (i) the determined prioritizations for respective ones of the plurality of file systems and (ii) the determined system performance of the destination storage node; and
   to execute the mount operations for the plurality of file systems on the destination storage node in accordance with the generated schedule;
   wherein generating the schedule for execution of the mount operations for the plurality of file systems comprises:
   placing different ones of the plurality of file systems into respective ones of two or more different execution queues in accordance with the static priority values assigned to the file systems; and
   ordering the file systems placed within each of the two or more different execution queues in accordance with the dynamic priority values calculated for the file systems and the predicted input-output loads for the file systems.

2. The apparatus of claim 1 wherein identifying the plurality of file systems to be mounted on the destination storage node comprises identifying a high availability event affecting a source storage node on which the plurality of file systems were previously mounted.

3. The apparatus of claim 1 wherein the plurality of file systems run on one or more network attached storage servers.

4. The apparatus of claim 3 wherein identifying the plurality of file systems to be mounted on the destination storage node is responsive to migration of the one or more network attached storage servers from a source storage node to the destination storage node.

5. The apparatus of claim 1 wherein the static priority value assigned to the given file system comprises a user-defined priority.

6. The apparatus of claim 1 wherein the dynamic priority value for the given file system is calculated based at least in part on one or more characteristics of the given file system.

7. The apparatus of claim 6 wherein the one or more characteristics of the given file system comprises a number of snapshots of the given file system.

8. The apparatus of claim 1 wherein the predicted input-output load for the given file system is determined utilizing an exponential moving average of historical input-output operations per second directed to the given file system.

9. The apparatus of claim 1 wherein the system performance of the destination storage node is based at least in part on one or more processing resource usage metrics, one or more memory usage metrics, and one or more input-output load metrics.

10. The apparatus of claim 1 wherein the determined system performance is dynamically updated during execution of the mount operations for the plurality of file systems, and wherein the generated schedule is adjusted based at least in part on the dynamically updated system performance.

11. The apparatus of claim 10 wherein adjusting the generated schedule comprises pausing scheduling of mount operations for one or more of the plurality of file systems responsive to the dynamically updated system performance being less than a designated performance threshold.

12. The apparatus of claim 10 wherein adjusting the generated schedule comprises adjusting a number of mount operations for the plurality of file systems which are permitted to be executed concurrently.

13. The apparatus of claim 1 wherein generating the schedule for execution of the mount operations for the plurality of file systems on the destination storage node comprises:
   generating the two or more execution queues, each of the two or more execution queues being associated with a different static priority value;
   adding a first subset of the plurality of file systems assigned a first static priority value to a first one of the two or more execution queues; and
   adding a second subset of the plurality of file systems assigned a second static priority value to a second one of the two or more execution queues.

14. The apparatus of claim 13 wherein generating the schedule for execution of the mount operations for the plurality of file systems on the destination storage node further comprises:
   ordering the first subset of the plurality of file systems within the first execution queue based at least in part on the dynamic priority values and the predicted input-output loads for the first subset of the plurality of file systems; and
   ordering the second subset of the plurality of file systems within the second execution queue based at least in part on the dynamic priority values and the predicted input-output loads for the second subset of the plurality of file systems.

15. A computer program product comprising a non-transitory processor-readable storage medium having stored therein program code of one or more software programs, wherein the program code when executed by at least one processing device causes the at least one processing device:
   to identify a plurality of file systems to be mounted on a destination storage node;
   to determine prioritizations for respective ones of the plurality of file systems, the prioritization for a given one of the plurality of file systems being based at least in part on a static priority value assigned to the given file system, a dynamic priority value calculated for the given file system, and a predicted input-output load for the given file system;
to determine a system performance of the destination storage node;
to generate a schedule for execution of mount operations for the plurality of file systems on the destination storage node based at least in part on (i) the determined prioritizations for respective ones of the plurality of file systems and (ii) the determined system performance of the destination storage node; and
to execute the mount operations for the plurality of file systems on the destination storage node in accordance with the generated schedule;
wherein generating the schedule for execution of the mount operations for the plurality of file systems comprises:
placing different ones of the plurality of file systems into respective ones of two or more different execution queues in accordance with the static priority values assigned to the file systems; and
ordering the file systems placed within each of the two or more different execution queues in accordance with the dynamic priority values calculated for the file systems and the predicted input-output loads for the file systems.

16. The computer program product of claim 15 wherein identifying the plurality of file systems to be mounted on the destination storage node comprises identifying a high availability event affecting a source storage node on which the plurality of file systems were previously mounted.

17. The computer program product of claim 15 wherein the determined system performance is dynamically updated during execution of the mount operations for the plurality of file systems, and wherein the generated schedule is adjusted based at least in part on the dynamically updated system performance.

18. A method comprising:
identifying a plurality of file systems to be mounted on a destination storage node;
determining prioritizations for respective ones of the plurality of file systems, the prioritization for a given one of the plurality of file systems being based at least in part on a static priority value assigned to the given file system, a dynamic priority value calculated for the given file system, and a predicted input-output load for the given file system;
determining a system performance of the destination storage node;
generating a schedule for execution of mount operations for the plurality of file systems on the destination storage node based at least in part on (i) the determined prioritizations for respective ones of the plurality of file systems and (ii) the determined system performance of the destination storage node; and
executing the mount operations for the plurality of file systems on the destination storage node in accordance with the generated schedule;
wherein generating the schedule for execution of the mount operations for the plurality of file systems comprises:
placing different ones of the plurality of file systems into respective ones of two or more different execution queues in accordance with the static priority values assigned to the file systems; and
ordering the file systems placed within each of the two or more different execution queues in accordance with the dynamic priority values calculated for the file systems and the predicted input-output loads for the file systems; and
wherein the method is performed by at least one processing device comprising a processor coupled to a memory.

19. The method of claim 18 wherein identifying the plurality of file systems to be mounted on the destination storage node comprises identifying a high availability event affecting a source storage node on which the plurality of file systems were previously mounted.

20. The method of claim 18 wherein the determined system performance is dynamically updated during execution of the mount operations for the plurality of file systems, and wherein the generated schedule is adjusted based at least in part on the dynamically updated system performance.

* * * * *